United States Patent [19]

Freer

[11] Patent Number: 5,392,502
[45] Date of Patent: Feb. 28, 1995

[54] MICROMACHINING SYSTEM AND METHOD

[76] Inventor: Edgar P. Freer, 7000 Scarborough Peak Dr., Canoga Park, Calif. 91307

[21] Appl. No.: 831,488

[22] Filed: Feb. 5, 1992

[51] Int. Cl.⁶ .................. B23B 21/00; B23B 25/06; G05B 19/00
[52] U.S. Cl. .......................... 29/52; 82/118; 82/158; 82/165; 364/474.02; 364/474.22
[58] Field of Search .............. 364/474.02, 474.11, 364/474.22, 474.26, 474.28; 82/118, 129, 141, 158, 142, 165; 29/54, 52, 53, 55

[56] References Cited

U.S. PATENT DOCUMENTS

| | | | |
|---|---|---|---|
| 2,473,306 | 6/1949 | Schreiber | 82/129 |
| 2,611,290 | 9/1952 | Bullard III | 82/129 |
| 3,763,360 | 10/1973 | Nishimura et al. | |
| 4,018,113 | 4/1977 | Blazenin et al. | 82/118 |
| 4,037,493 | 7/1977 | Freer. | |
| 4,106,376 | 8/1978 | Freer. | |
| 4,457,193 | 7/1984 | Matthey | 82/129 |
| 4,672,550 | 6/1987 | Winterbottom et al. | |
| 4,698,766 | 10/1987 | Entwistle et al. | |
| 4,719,676 | 1/1988 | Sansone | 82/129 |
| 5,008,828 | 4/1991 | Pinard et al. | 364/474.28 |

FOREIGN PATENT DOCUMENTS

| | | | |
|---|---|---|---|
| 123201 | 7/1985 | Japan | 82/129 |
| 94202 | 4/1987 | Japan | 82/129 |
| 56708 | 3/1988 | Japan | 364/474.22 |
| 2159750 | 12/1985 | United Kingdom | 82/129 |

Primary Examiner—Daniel W. Howell
Attorney, Agent, or Firm—Merchant, Gould, Smith, Edell, Welter & Schmidt

[57] ABSTRACT

A micro-machining center, in the form of an automatic screw machine, utilizes an array of tools and machining support mechanisms removably mounted on a carriage movable parallel to a first axis, and a spindle/collet mechanism movable parallel to a second axis, with machining and manipulating operations being conducted at the intersection of the two axes in a common plane. A microprocessor control system having multiaxis command capability precisely drives the carriage and spindle/collet mechanisms separately or concurrently to perform a sequence of supported machining functions for fabrication of a given part from stock. With this arrangement of microprocessor, tools and spindle/collet mechanism commands for manufacture of a part can readily be generated, verified, used and retained in storage for later use. The system operation is greatly facilitated by a video display providing a magnified image of stock and tool positions and machining operations at the intersection of the two axes, together with a joystick control and single step operation through the sequence, made possible by the microprocessor system.

29 Claims, 8 Drawing Sheets

MICROMACHINING SYSTEM AND METHOD

BACKGROUND OF THE INVENTION

This invention relates to systems for rapid tooling and production of precision small parts, and more particularly to an improvement in automatic screw machines for manufacturing small parts using a sequence of different machining operations.

The automatic screw machine is one type of automatic machine tool that has been highly developed and is widely used in modern metal and plastic working facilities. The screw machine is usually employed to turn out, at a relatively high production rate, parts smaller than those manufactured using horizontal and vertical turret lathes. Such screw machines are typically horizontal automatics, and may have single-spindle or multiple-spindle configurations. In either machine, the stock to be machined is fed through a hollow machine spindle and collet to extend outwardly toward a 5- or 6-position turret or drum. The turret is indexed to place a desired tool in position and the tool is then fed longitudinally against the end of the rotating workpiece. Drills, reamers, hollow mills and counterboring tools are used for facing, drilling, reaming, forming, knurling and other operations. Usually, two independent cam-actuated cross slides are provided to hold forming, grooving or cutoff tools.

In multiple-spindle automatics, several machine spindles are typically arranged in a circular pattern and indexed in a carrier about a non-rotating turret which carries a variety of cutting tools. Successive machining operations therefore can be performed by the cutting tools as the spindle indexes and progresses around the carrier, and throughput can be increased by concurrent operations at the indexing locations. With such systems the screw machine operator tools the setup for high production by selecting the tools to be used in the machine, precisely adjusting them relative to the stock position at which cutting, forming or another operation is to take place, and making necessary adjustments during operation to compensate for wear during high production runs. The more skilled the operator, the shorter the setup and adjustment time, and the higher the throughput. No matter how skilled the operator, however, tooling operations of this type are not suited for economic manufacture of relatively small quantities. Also the machines are not well adapted for operations on small stock, of the order of ¼" in diameter.

These factors have imposed restraints on the ability to realize full benefit from state of the art technology in product design. Computer-aided design techniques have now made it feasible to define many products by use of computer hardware and software specially adapted for such objectives. Thus a specific part for an assembly may be designed and checked out thoroughly in relation to other parts in the assembly prior to fabrication of the first prototype using CAD hardware and software. This facilitates the design process, but industry also seeks prototype manufacture within a time frame consistent with the short period in which the design can be generated. Moreover, there is a constant tendency to miniaturize products while improving their performance, further complicating the problem of rapidly making small or preproduction quantities. It is highly desirable, therefore, to have an automatic screw machine for micromachining operations that meets such needs.

A consequence of the fact that a design can be generated and its dimensions and operations can also be specified by using a data processor system is that the mechanical setup procedure for a conventional screw machine introduces a backward step, in that the computer output must be translated to mechanical settings. When part configurations have been digitally specified, a suitable machine tool that can be quickly set up from such data can bypass a substantial part if not all of the mechanical tooling problem. However, the data processing portion of the system should be so arranged that an operator having limited training can develop all needed skills quickly. The operator should be enabled to tool a new machining operation quickly, call forth a wide variety of part fabrication sequences from storage, and readily make adjustments and corrections as needed. These objectives should be accomplished in ways that maintain the needed level of precision in the parts being produced. They cannot readily be met by computerized numerical control systems, because of the complex programming that must be done to set up most such systems in three dimensions for a particular new operation by conventional numerical control techniques.

SUMMARY OF THE INVENTION

In systems and methods in accordance with the invention, a stock to be machined is held in a spindle movable along a first axis in a horizontal plane while a number of tools are disposed along a second axis orthogonally intersecting the first axis. Machining operations are performed at or close to the orthogonal intersection by bringing the stock and each selected tool successively into position and then driving the tool or stock, or both, in controlled fashion. The tool and stock positions relative to the x and y axes are held in data storage, while the mechanism configuration assures precise translation of the different devices along their respective axes. A computer control system stores successive machining functions, including relevant dimensional data, for each part that is produced. Using a sequence of particular functions for each particular part, and two-dimensional tool and stock position data, the control system generates commands for sequencing of the operations and dynamic control of the machining functions. Manipulation and support functions, such as feed and reversal of stock, and supply of coolant, are also provided concurrently under computer control.

The system is organized such that, in combination with the orthogonal reference axes, a relatively unskilled operator can tool and verify the sequence for making a particular part. A hierarchy of command tiers can be used in assembling the control sequences for specific parts, starting with primitive control commands held in storage. These commands can be assembled into macro-sequences which assure that elemental device functions are carried out in an orderly fashion. Once established, these macro-sequences can be employed in all operations without change. Assembly of the macro-sequences into particular machining functions enables these as well to be held available in storage for use by menu selection. Thus the operator can chain together a number of machine functions into a part sequence, which can then be characterized by name and held in storage. Dimensional control data can be inserted in different convenient ways for each particular part, as by keyboard entry of an absolute value or by manual stepping control. This approach is facilitated because the positions of the different tools in the array are referenced to the operative X, Y intersections, and because reliance can be placed on the translational positions of the spindle and tool mechanisms. Since only sequences of digital tool and stock commands are generated, for separate or concurrent control of tools and spindles, no mechanical adjustments are needed for setup, except where a new tool is to be added or substituted to the available array. The system is therefore "tooled" for a specific part by manipulation of data in the equivalent of a high level language.

The tooling operation and verification of product quality are also facilitated because the critical X, Y intersection area is invariant and is monitored by an imaging video camera, with a magnified view of the scene being presented to the operator on a video screen. The operator also has a joystick control for moving the spindle and tool, with the movements being monitored by the data processor. Terminal positions for each function can thus be selected or adjusted with ease, and the progress of a machining operation can be observed constantly during setup procedures and thereafter during operation.

A specific example of the system comprises a machine tool in which a tool support carriage is mounted on slide means to translate precisely under stepper motor control along a given horizontal axis, which may be called the Y axis. The spindle mechanism, using one or two spindle/collet devices, is translatable by stepper motor control along an orthogonal X axis lying substantially in the same horizontal plane as the Y axis. The stock to be machined is held in the rotatable spindle/collet end extends toward the X, Y intersection, being translated along the X axis on a linear ball bearing slide mount. The tool support carriage is the movable base for a number of replaceable and movable tool holders which are adjustable relative to the horizontal plane so that each tool can be positioned along the Y axis at a selected location and also adjusted in the X and Z directions. Some toolholders may be mounted directly on the tool carriage, while smaller tool holders are advantageously mounted in sets on support pads coupled to underlying tool mounts slidable along the tool support carriage. The tools include both active and passive cutting devices, functional in different directions. Similar means can also be used to attach stock manipulative and function support devices to the tool support carriage. The X and Y axis locations of the functional portions of the tools are stored in memory as reference positions for use with the available function sequences. With a number of different tools on the slide, a wide variety of screw machine functions are readily implemented by the system. Thus, with a data storage capable of holding the command sequences for many different parts, the system can machine given quantities of many items without further adjustments.

More specifically a two-spindle machine, having two X, Y operational locations, incorporates a joystick control, a video camera and a TV monitor arranged to provide a large-scale, magnified image of the operational region. Key entry commands are used for dimensional control along with X, Y control by the joystick, changes of position being held in memory in either event. The system provides for single step performance of machine functions under key control, so that the operator can visually verify positions before and after each machining step in a part sequence, and can make any needed adjustments before proceeding to the next function. The upper section of the slide defines the Y axis reference along which the tool mounts or tools are positioned. Some of the tool holders or supports may be split along bevelled surfaces, so that adjustments can be made relative to the X and Z axes. This is done by relative movement of the bevelled surfaces, together with vertical adjustments with shims or horizontal adjustments with a separate holder. The tools may comprise turning tools, drills, milling tools, threading tools, boring tools, saws and other slotting devices. Manipulative devices such as index positioners, turnaround tools and grippers are provided, along with support units such as coolant supply tubes. A collector for finished parts is mounted adjacent to the X, Y axes intersection and a tray for retaining coolant is disposed below the row of tools. With this arrangement, there is no limitation, except for size, on the tools that can be added to or substituted in the tool support carriage. After the needed array of tools has been positioned, the X and Y axis locations for the operative elements can be quickly ascertained and entered into the data storage system. If wear occurs it can be determined by part measurements or inspection and compensated by numerical adjustment or referencing to cross hairs of the reference intersection on the magnified display.

A feature of the invention is a mechanical system having X and Y axis slides arranged orthogonally relative to each other, with carriages slidable along double linear ball slides along the separate axes. Preferably the Y axis slides include a pair of transversely placed elements which have inverted dovetails and are at different elevations, for support of the tool holder support carriage. Ball screws driven by digitally commanded stepper motors provide very exact positioning, and coordinated movement, if desired, of the carriages and associated elements. With this arrangement unique functions can be performed, such as drilling angled holes in a part at different circumferential locations.

BRIEF DESCRIPTION OF THE DRAWINGS

A better understanding of the invention may be had by reference to the description, taken in conjunction with the accompanying drawings, in which.

DETAILED DESCRIPTION OF THE INVENTION

Figure 1:
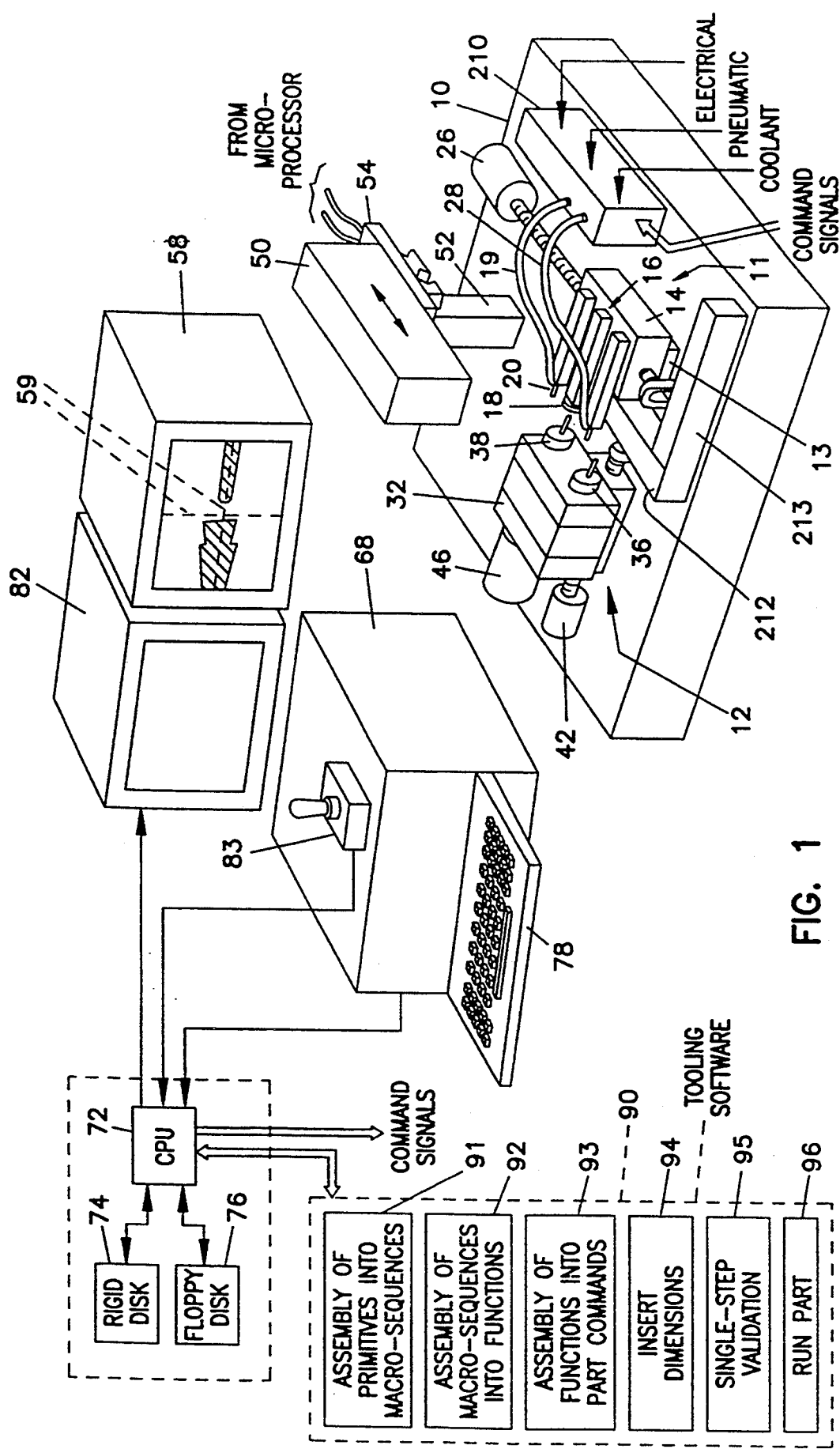
FIG. 1 is a simplified perspective view of the principal operative units of a micromachining mechanism, including a block diagram of the principal data processing units, to form an example of a system in accordance with the invention.

A "software tooled" screw machine system and method in accordance with the invention, for micromachining of a wide variety of parts, is depicted in general form in FIG. 1. A unique coaction is established because geometry of the structural mechanism that performs physical functions, simplifies the organization of an electronic control system that commands the operation of the mechanism. The geometry is based upon the physical reference of the two principal subsystems of the mechanism to the intersection of horizontal X and Y axes designated as such in FIG. 1. The horizontal and orthogonal X and Y axes intersect above a stable bed 10 which supports a tool mechanism 11 bidirectionally movable along the Y axis, and a spindle mechanism 12 bidirectionally movable along the X axis. The upper horizontal surface of the bed 10 supports guide means 13 (shown only generally) which are spaced apart from but parallel to the Y axis, and a carriage 14 which is suitably mounted on the guide means to be reciprocated along the Y axis at a fixed distance from the Y axis. A number of tool holders 16 are replaceably and stably mounted on separate pads 17 on the carriage 14, or on the carriage 14 itself, at selectable locations along the Y axis. The carriage 14 is movable along a sufficient span of the Y axis relative to the X, Y intersection for any tool to be placed in position for use at the intersection.

Stock manipulating devices 18, which adjust or move the bar stock rather than perform machining operations on it, are also mounted removably on the carriage 14 at selectable Y axis positions, separate from or interspersed between the tool holders 16. The stock manipulating devices 18, one of which is shown only generally in FIG. 1, may comprise units for reversing the stock, or positioning it with reference to a particular location. Also, operation support units 19, such as coolant flow tubes, are mounted on the carriage 14, above the tool holders 16.

Tools 20 of different types are held in adjustable and replaceable fashion on the different tool holders 16 at the ends facing the Y axis. The tools 20 may comprise passive elements, such as axial drill bits of different sizes and shapes, extending parallel to the X axis, and milling bits extending parallel to the Y or Z axis. It may also comprise active elements, such as saws driven rotationally about a selected axis for cutting slots in a piece of bar stock. Further details of typical tools, stock manipulating, and support devices are shown and described hereafter. The operation support units 19, whether coolant flow tubing, hydraulic or pneumatic lines or electrical conductors are conveniently attached to a common control housing 21 mounted on the bed 10 on the side of the carriage 14 opposite the Y axis. The lines are long enough to compensate for the span of movement of the Y axis carriage 14.

The Y axis carriage 14 is driven by a Y axis stepping motor 26 via a first ball screw 28 that is threadedly engaged in the carriage 14 in conventional fashion. The active tools 20, stock manipulating devices 18, operation support units 19, and the Y axis stepping motor 26 all receive actuating signals from a microprocessor control system, as described hereafter.

The spindle mechanism 12 is supported on an X axis guide means 30 mounted on the bed 10 and comprises a spindle frame 32 mounted on an X axis carriage 34 that reciprocates along the X axis direction under microprocessor control. At the Y axis side of the spindle frame 32, first and second spindle/collet mechanisms 36, 38 of conventional type are mounted to extend bar stock 40 forwardly toward the tool mechanism 11 and to progressively feed or allow withdrawal of the stock. A spindle motor 42 mounted on the spindle frame 32 behind the spindle/collet mechanisms 36, 38 is coupled to drive either of the spindles 36, 38 via a transmission 44 described more fully below. The two spindle combination affords somewhat greater facility and versatility in carrying out machining operations on a single or two separate pieces of bar stock. However, a single spindle/collet system in accordance with the invention can also be employed advantageously in most circumstances.

The entire spindle frame 32 and the mechanisms mounted on it are reciprocated along the X axis guide means 30 under control of an X axis stepping motor 46 which drives a second ball screw 48 (shown in more detail in FIG. 10) that is matingly engaged in the spindle frame 32. It can be seen that this mechanism establishes two alternative X, Y axis intersections, with the Y axis being invariant but the X axis depending upon which of the spindles 36, 38 is to be used. The spindle/collet mechanisms 36, 38, and the internal means for feeding and advancing bar stock 40 within them may be of conventional types and need not be more fully described.

In conjunction with this mechanism there is also employed a video camera 50 incorporating magnifying optics, the camera 50 being mounted to view the X, Y intersection downwardly along a vertical optical axis. The camera 60 include magnifying optics (not shown in detail) to provide a substantially enlarged image (e.g. 20×) for a visual display unit. A known type of ring light illuminator (not shown in detail) about the camera optical axis is employed to assure adequate illumination of the area under view. A camera support 52 mounted on the stable bed 10 holds a pneumatically operated camera positioner 54 which receives microprocessor control signals, and the positioner in turn supports the camera 50. The camera positioner 54 shifts the optical axis of the camera 50 horizontally along the Y axis between the two alternative X, Y intersection points, depending upon which spindle/collet mechanism 36 or 38 is in operation. Video signals from the camera 50 are coupled to a video monitor 58, on which the magnified scene at the X, Y intersection is displayed. The magnification is such that visual alignment alone is usually sufficient to provide adequately accurate relative or absolute positioning of the tool 20 and stock 40 or of the tool or stock relative to cross hairs 59 on the face of the monitor 58.

In close physical proximity to the bed 10 is a console 68 for a microprocessor control system 70, some of the component parts which are shown separately in block diagram form for added clarity. The CPU 72 of the microprocessor is, in this example, an IBM PC type of microprocessor having a DOS type of operating system. The CPU 72 is coupled to typical peripheral equipment, such as a high capacity (e.g. 40 megabyte) hard disk 74, a floppy disk drive 76, a keyboard 78, and a video display unit 82, which is conveniently placed in proximity to the monitor 58 for the video camera 50. A joystick control 83 on the console 68 and coupled to the CPU 72 enables the operator to generate X and Y axis movements that are automatically monitored by the system. The CPU 72 includes a commercial motion card (not shown) that generates the individual command signals for the various controlled units, whether electrical, pneumatic or hydraulic.

The system of FIG. 1 references the positions of both the stock 40 and the operative surfaces of the different tools 20 to the X, Y intersection, and eliminates the need for precise spatial mechanical adjustment of tool position. Tooling of the system to make a given part is predominantly done with software, aided by the user-interactive visual feedback of relative positions displayed on the video monitor 58. Because the tool and work positions can be precisely referenced to the X, Y reference by visual means, irregularities in the drive and support systems do not introduce errors in position on successive operations.

The expression "tooling software" is appropriate, because the organization of the structure and sequencing of operations are such that successive machining functions can be readily selected and custom-adjusted for making a given part, after using only engineering drawings, or empirically derived instructions. The tooling software 90 is based, at the most fundamental level, on one of a number of commercially available motion control software systems using the optional motion control card in the CPU 72. This software, retained in storage or in a floppy disk, provides selectable control commands for stopping, accelerating and decelerating the spindle drive and tool carriage drive. The operator of the system thus has such primitives available and is not concerned with changing them. However, the next level 91 of the hierarchy involves assembly of the primitives into macro-sequences which constitute sub-functions in the machining of a part. The assembly steps 91 are such that a number of them are used without change. Once entered in storage, they can be extracted from a menu presented on the display screen as needed. The macro-sequences assure, for example, that the operative elements are properly activated, motors turned on or off, coolant is supplied as necessary and that other conditions are met for each fundamental step. Then, the macro-sequences may be assembled in a next step into machine functions 92, the machine functions being, for example, drilling, threading, sawing, slotting, and any other option for which a tool may be available. The operator is enabled to change functions and add new functions without writing new software because of the ready availability of the macro-sequences. Assembly of a number of different functions into commands for an individual "part", designated with a unique name by the operator, is carried out in the next step 93. Here the operator chooses the successive functions desired, and the macrosequences assure that tool selection and positioning, spindle positioning and operation, and support services, are carried out in an orderly fashion.

Dimensional information is entered separately in the next step 94 either by the joystick 83 control or by key 78 entry of absolute values. The joystick 83 is operated while observing the display 82, and one can readily place and adjust both the spindle and tool mechanisms relative to each other and the electronic cross hairs on the display 58. This is generally close enough for meeting tolerance. The operator can then make a simple key entry to record the selected position in memory at the CPU. Absolute values for positioning can also be entered via the keyboard 78, to define the start points, end points, and any intermediate stops. After a part is made, if changes are needed they can be entered in this manner on the basis of measurements made on the finished part.

The complete sequence for micromachining a part is thus readily created for each new part. For accurate operation, this should usually be confirmed at each step in the sequence. The microprocessor control permits such careful analysis by observation of what is done during each machine function, which may be carried out separately. Based on what is observed, corrections can be made by the joystick control or key entry. Assuming that one complete run through of the functions is sufficient to fabricate a satisfactory part, no further tooling is necessary, and the system can then proceed to repetitive manufacture of parts 96, using a continuous sequence of commands.

This system organization enables very rapid setup and short-run manufacture of parts with high precision. The resolution of the computer system is capable of far greater accuracy than the mechanism can accommodate. Therefore, the accuracy with which dimensions can be followed is determined by the mechanical components and subunits, such as minute errors in the periodicity of the ball screw mechanism. System wear in short run production is not a significant factor, particularly with small size parts, but if an error occurs one need only revert to the single step operation and correct the relative positions or rates of movements. Because the machining operations are referenced to the X, Y intersection, cumulative errors are not introduced.

Simplified software tooling is made possible by Y axis alignment and movement of the tools along the Y axis, by the orthogonal X axis movement of the spindles and by the X, Y intersections, in relation to the user-oriented software. The spindle system and the tooling system are arranged such that translation along their respective axis is stable and precise, and introduces minimal translational errors, while changes of position are readily monitored by the CPU. Consequently, changes of position do not require either new physical adjustments or new computations, and user-friendly software can be employed for tooling.

A specific electromechanical system for realization of the potential of the present concept is illustrated in the various views of FIGS. 2-10. This example provides a high precision system, with substantial flexibility, but at reasonable cost. However, it will be appreciated that a number of alternative approaches may present themselves to those skilled in the art. The system maintains the operative elements in precise relation to the common horizontal plane through which the X and Y axes, 100, 101 extend. It also assures undeviating linear movement along the X and Y axes, 100, 101, despite the loading and dynamic forces that are exerted during operation. Moreover, it is arranged such that the incremental motion control is adequately precise to assure virtually exact positioning without a closed loop sensing and control arrangement. This applies both to indexing of the spindle mechanisms and positioning of the tools 20.

Figure 2:
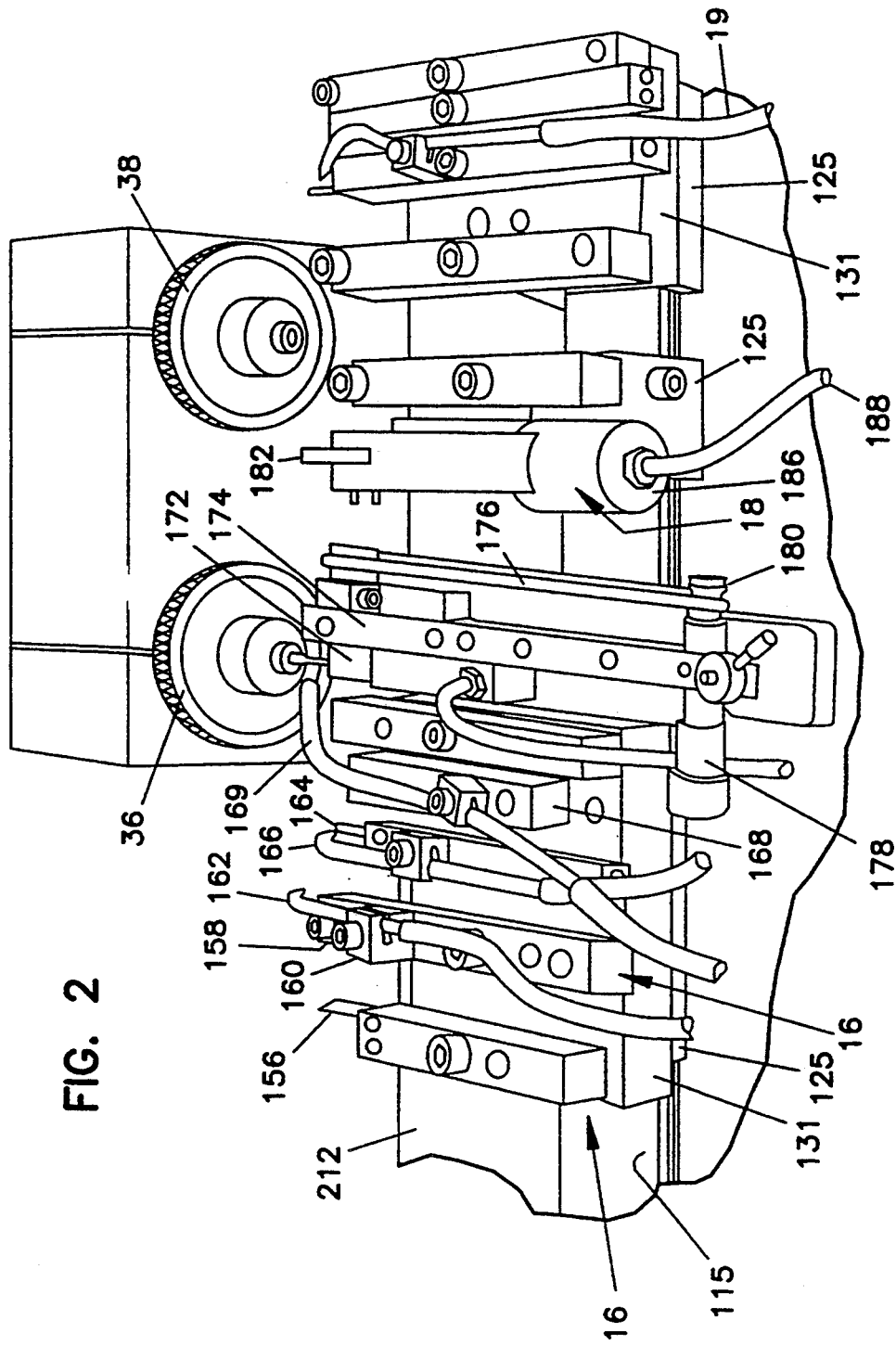
FIG. 2 is a perspective view, partially broken away, showing in greater detail the arrangement of tools and spindles in the system of FIG. 1.
Figure 3:
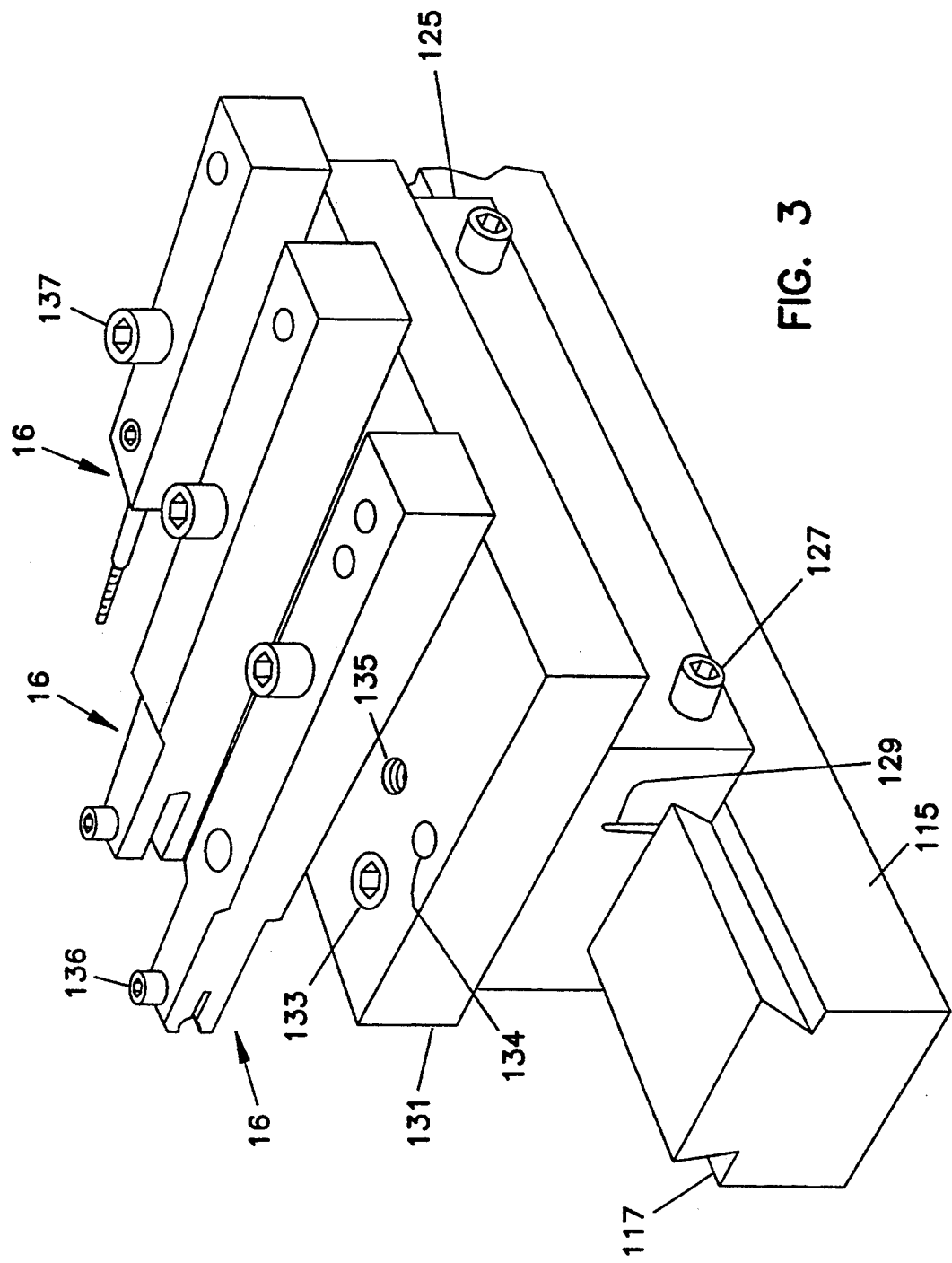
FIG. 3 is a fragmentary perspective view of a part of the tool portion of the system of FIGS. 1 and 2.
Figure 4:
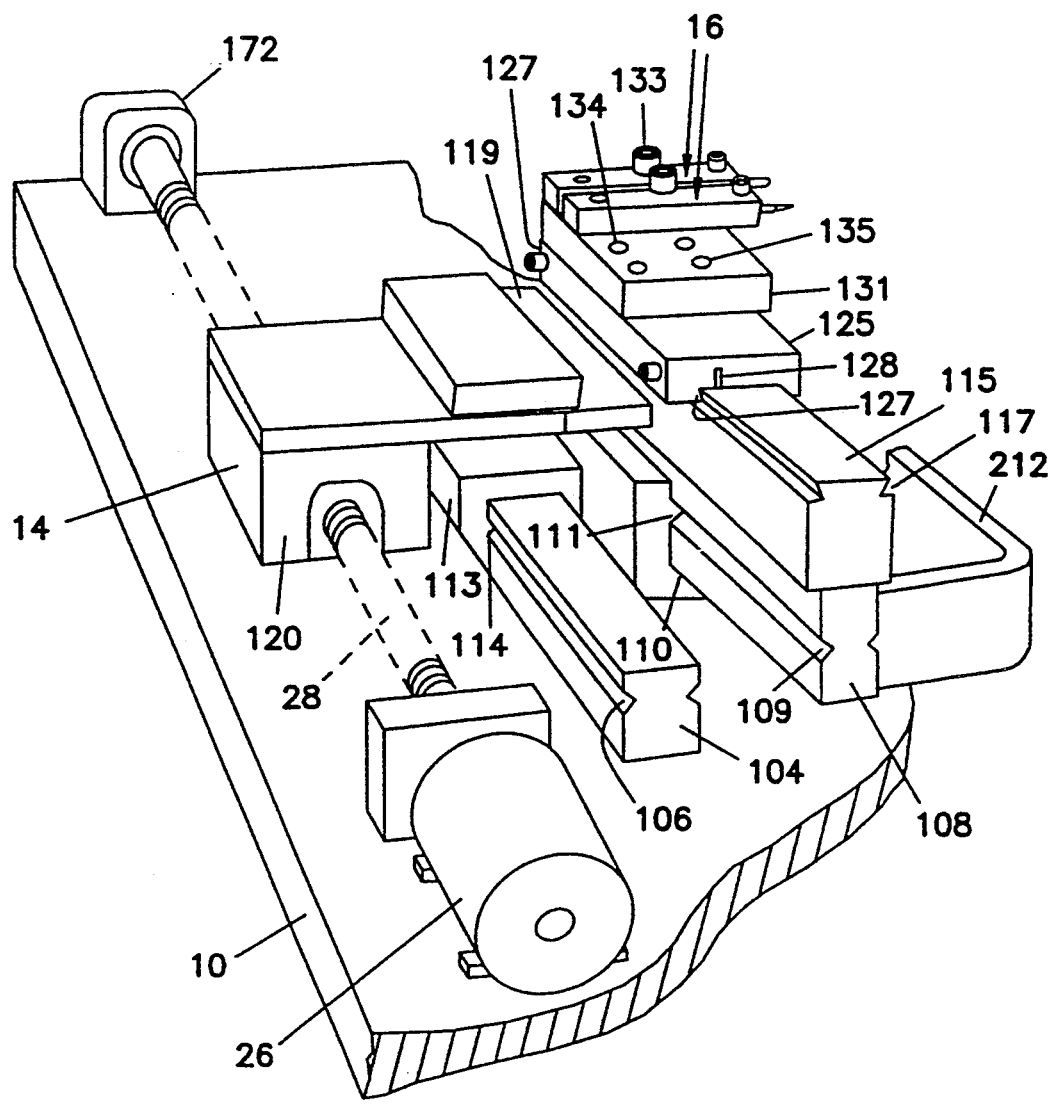
FIG. 4 is a perspective fragmentary view of the slide mechanism and stepping drive for the tool portion of the system of FIGS. 1-3 as viewed from the rear of the machine.

The electromechanical system is mounted on the stable horizontal bed 10 and comprises both the tool mechanism 11 and spindle mechanism 12 of FIG. 1. FIGS. 2-4 show in perspective how these different mechanisms are generally arranged, relative to the X and Y axes 100, 101 and the horizontal reference plane.

The tool mechanism 11 will be considered first, relative to FIGS. 2-4. The Y axis guide means 13, not visible in FIGS. 2 and 3, can be seen in FIG. 4 to comprise a pair of guide rails, a first 104 of which is fixed along the bed 10, in alignment with the Y axis, and includes side grooves 106. A second Y axis guide rail 108 having side grooves 109 is also mounted parallel to the Y axis, and is spaced apart from and above first guide rail 104, retaining a fixed U-shaped support 110 having linear ball bearings 111 mating within the side grooves 109 in the second guide rail 108. The side grooves 106 in the first guide rail 104 are near the upper edge of that guide rail 104, while the side grooves 109 in the second guide rail 108 are of intermediate height, so that the grooves 106, 109 are substantially in the same horizontal plane. The carriage 14 includes a second member 113 that is a U-shaped follower resting on the top of the first guide rail 104, and having linear ball bearings 114 which engage in the side grooves 106 of the first guide rail 104. This spaced apart, differentially mounted, arrangement of the guide rails 104, 108 provides low-friction longitudinal ball bearing support for the carriage 14 along the Y axis direction, while resisting torsional and side forces exerted during system operation.

The carriage 14, as seen in FIG. 4, also includes a tool mount 115 attached to the top of the second guide rail 106 and having a dovetail-sectioned upper surface 117 that has a horizontal superior surface and side edges that are parallel to the Y axis. The coupling between the principal part of the carriage body 14 and the tool mount 115 comprises a side extension 119, so that the U-shaped follower 114, tool mount 115 and second guide rail 108 all move together in parallelism along the Y axis. The Y axis stepping motor 26 turns the first ball screw 28, a portion of which engages with a nut 120 in the carriage 14 body, thus stepping the entire carriage mechanism 14, including the tool mount 115 and all the elements supported thereon, along the Y axis. The terminal free end of the lead screw 28 rests in a fixed block 122 on the bed 10.

The elements disposed on the tool mount 115 comprise all the cutting, manipulating and support elements used in the machining operations, a number of different types of which are shown in FIGS. 2 and 3. As described below, some tool holders may be configured so that they fit directly on the tool mount 115. For flexibility, convenience and compactness, however, and for versatility and adjustment in use, a multi-component arrangement may be employed for supporting and positioning the tools. In this version, separate tool mount attachment blocks 125, best seen in FIGS. 3 and 4, are mounted at selectable positions on the upper surface of the tool mount 115, having a dovetail 126 on the underside matching with the dovetail-sectioned upper surface 117 of the tool mount 115. One or more SET screws 127 in the side of the tool mount attachment block 125 penetrate horizontally through vertical slots 129 in the tool mount attachment block 125, for use in tightening of the block 125 on the tool mount 115. A tool holder pad 131 is long enough along the Y axis to support a number of individual tool holders 16. Each tool holder pad 131 is attached to the underlying tool mount attachment block 125 by one or more SET screws 133 and includes one or more alignment holes 134 and threaded holes 135, extending vertically, for receiving the tool holders. In the example of FIGS. 2 to 4 the tool holders 16 are unitary blocks having a tool gripping device at the forward end and at least one SET screw 136 for gripping the tool and another SET screw 137 for attachment to the pad 131.

Figure 11:
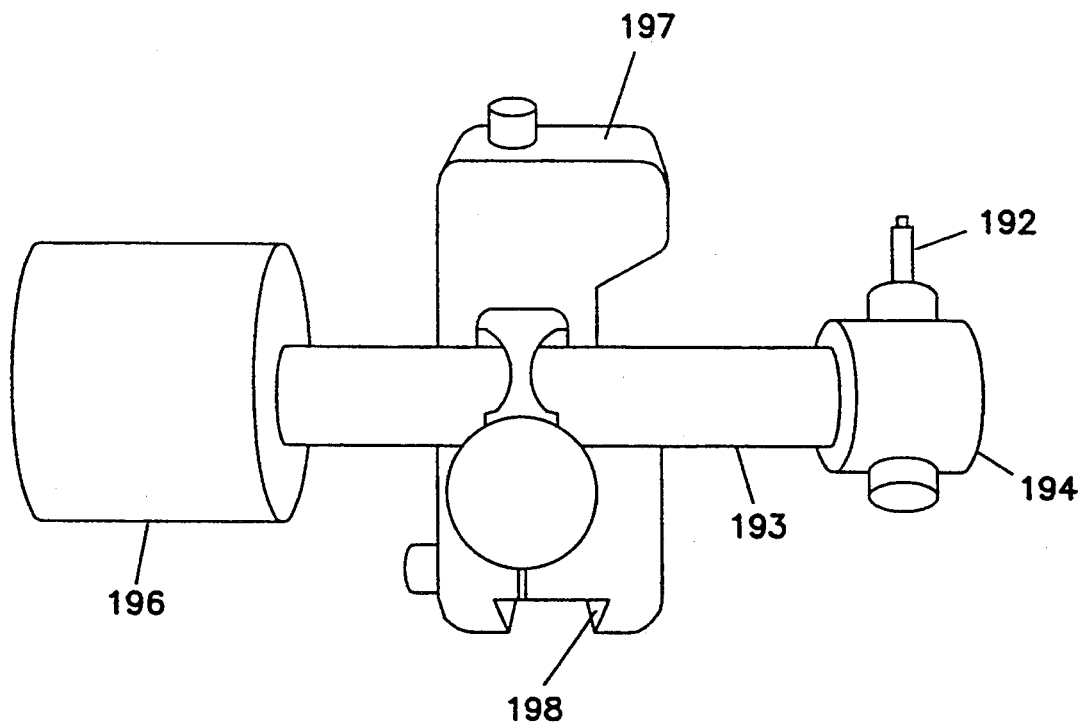
FIG. 11 is a perspective view of a side drill tool that may be employed in the system.
Figure 12:
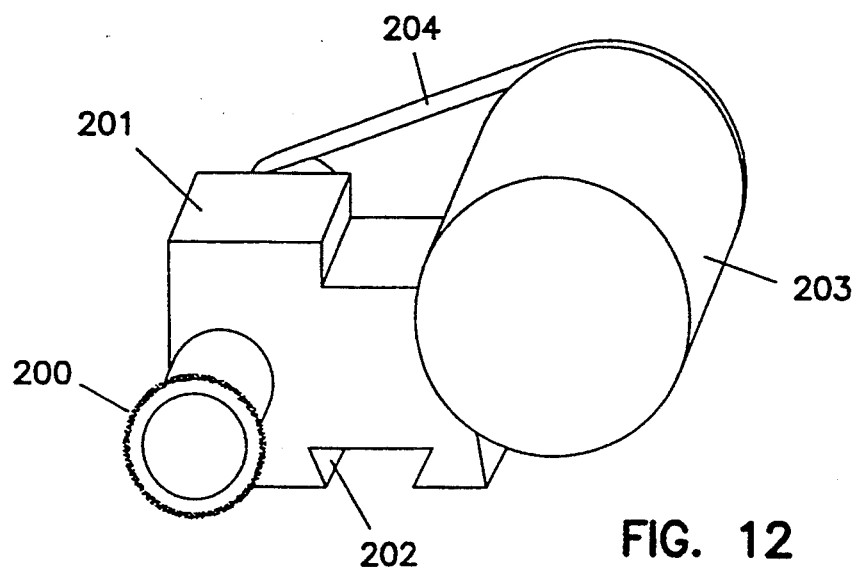
FIG. 12 is a perspective view of a saw tool that may be employed in the system.

The tool holder pads 131 typically each receive more than one tool holder that is attached removably at the threaded holes. The attachments 125 can alternatively be used as direct supports for tool holders 16, or as shown in FIGS. 11 and 12 and described hereafter, different special tool mount attachments can be employed for direct coupling to the tool mount 115.

Figure 5:
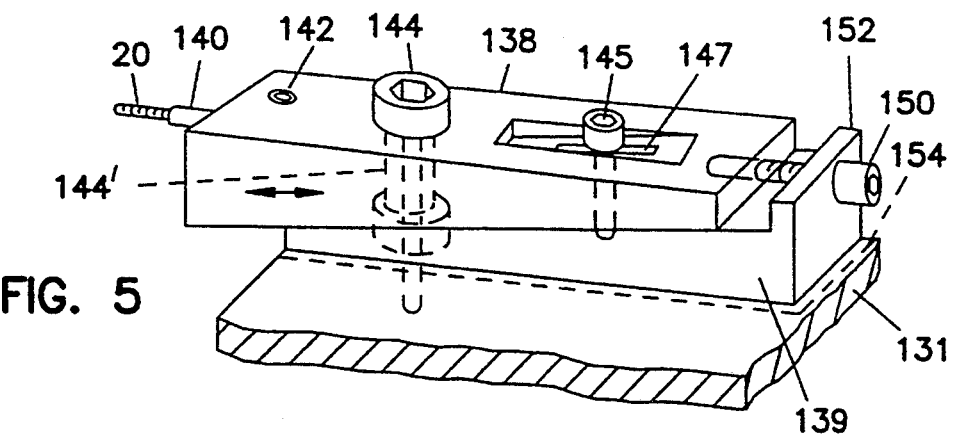
FIG. 5 is an enlarged perspective view of a split and bevelled tool holder that may be used in the system of FIGS. 1-4.
Figure 6:
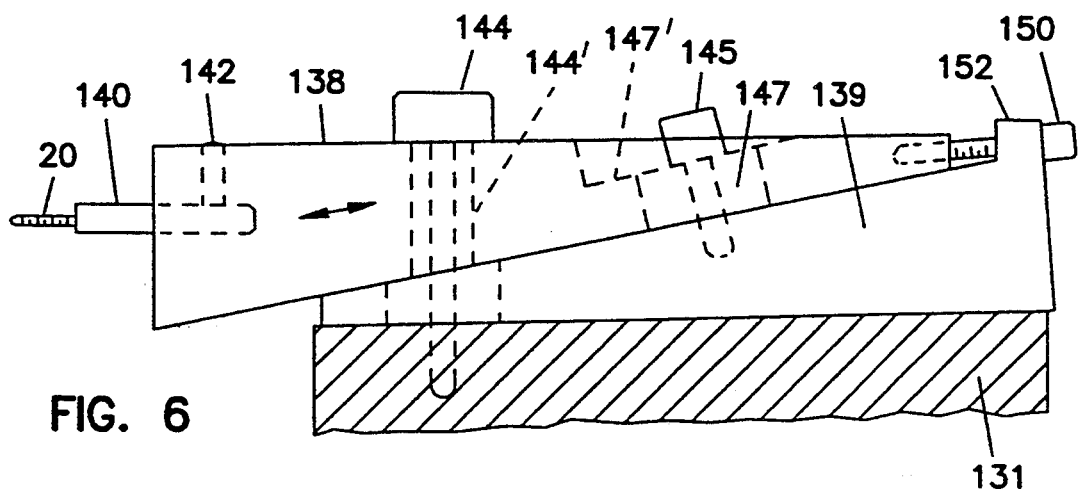
FIG. 6 is a side view of the arrangement of FIG. 5.

As seen in FIGS. 5 and 6, advantageous alternative tool holders 16 comprise split block structures divided along an angled line that tapers downwardly toward the front. In FIGS. 5 and 6 the angled line divides the tool holder 16 into an upper half 138 and a lower half 139. The two halves 138, 139 of the tool holder 16 are slidable relative to each other along the X axis, and also adjustable along the same axis relative to the underlying pad 131. By use of these adjustments, a tool, here a centering drill 140 fixed in place by a drill attachment screw 142 may be both raised and lowered, as well as moved in and out. Holder attachment cap screws 144, 145 extend through both halves of 138, 139 of the tool holder 16. One cap screw 144 engages in the pad 131 (FIG. 6) through a bore 144' which is large enough to allow the needed degree of relative movement, while the head of the cap screw 144 overlaps the edges of the bore 144' for adequate mechanical restraint. The other cap screw 145 is angled into the lower half 139 of the split block to thread into an appropriate threaded hole angled in the same direction. The position of one of the two halves 138, 139 of the holder relative to the other also is adjustable because the screw 145 rides in a slot 147 having an upper surface 147' slanted parallel to the engaging faces of the two halves 138, 139. The end of the cap screw 145 seats in a threaded hole in the lower half 139, to secure the relative X axis position. Longitudinal adjustments of the upper half 138, are held firm by another angled cap screw 150 that threads lengthwise through an end piece 152 extending upwardly from the lower half 139 of the tool holder 16. The inserted end of the capscrew 150 engages the end of the upper half 138 resisting motion along the X axis. As shown in dotted line form in FIG. 5, a shim 154 may alternatively be disposed between the tool holder 16 and its underlying mount 131. A shim may also or alternatively be disposed between the sliding faces of the two halves of the tool holder. The shim 154 can be used to alter the level of the tool a selected amount, to bring it to the horizontal working plane with the tool 20 in the desired position along the X axis.

Figure 7:
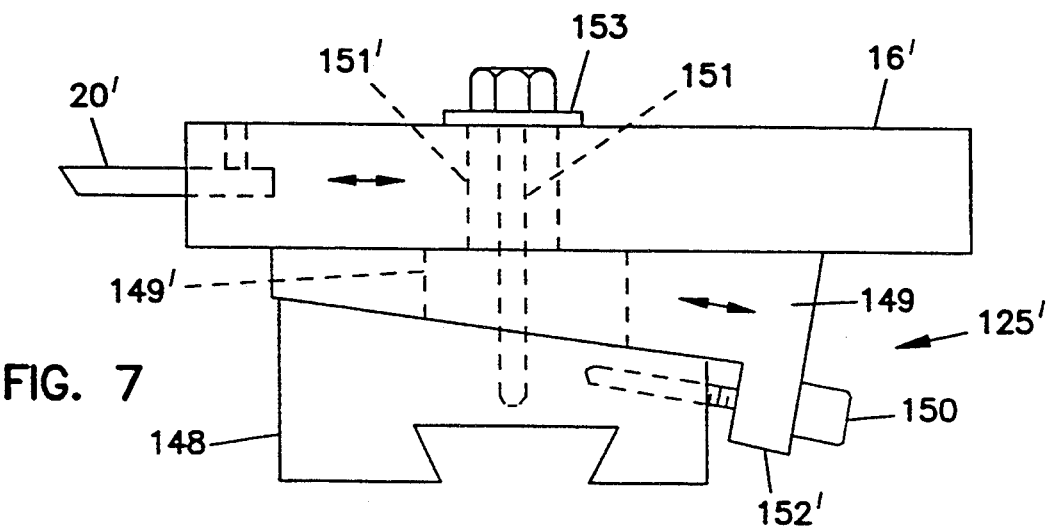
FIG. 7 is a slide view of a modification of the arrangement of FIG. 6, showing a split and bevelled tool mount with an adjustable tool holder.

A different arrangement of tool holder 16' and tool mount attachment 125' is shown in FIG. 7, wherein the tool mount attachment 125' comprises a split block divided along a slanted line. The lower half 148 of the attachment 125' has a dovetail section for mating engagement on the upper surface of the tool mount 115. The means for tightening the lower half 148 on the mount 115 may be as shown in FIG. 3, so is not depicted in FIG. 5. The upper half 149 of the tool mount attachment 125' has a horizontal upper surface for receiving the tool holder 16', and a interior slot 149' through which a screw 151 extends to be seated in the lower half 148. A wide bore 151' in the tool holder 16' allows X axis shifting of the tool holder 16' through an adequate distance for X axis adjustment. A washer 153 spans the bore 151 under the head of the screw to maintain the tool holder 16' firmly in position at the chosen X axis location. The upper half 149 of the tool mount attachment 125' may therefore be move in and out along the X axis to provide height adjustments, which the tool holder 16' can also be moved horizontally to place the tool 20 at the chosen X axis location.

The assortment of tools 20 and tool holder 16 supported on the tool mount 115 in FIGS. 2 and 3 is representative of one typical assortment of units used in actual operation. Starting from the left-hand side of FIG. 2 and proceeding toward the right, the tools utilized comprise a bevelled cutting tool 156, a side cutting tool 158 transverse to the longitudinal axis of the tool holder, on which is also mounted a holder 160 for a coolant pipe 162. Next is a drill bit 164 on the holder for which is also mounted a coolant pipe 166. On the same tool holder pad is a support bracket 168 for a coolant pipe 169 that extends over to the next machining position, at which a rotary tool 172 is mounted on an elongated adjacent tool holder 174. The rotary tool is driven by a belt 176 from a motor 178 driving a capstan 180, disposed at the opposite end of the tool holder 174. Next in line, a stock gripper 182 having a pair of jaws 183, 184 is driven by an external piston 186 powered by a pneumatic line 188. The stock gripper 182 and an adjacent tool on a tool holder 16 are mounted directly on a tool mount attachment block 125, without an intervening tool holder pad 131.

The successive tool holders and other devices along the tool mount 115 in line are all attached to other tool holder pads or tool mount attachment blocks or the tool mount directly. Thus the available tools and support devices can comprise a variety of other tools or like tools of different sizes. Referring to FIG. 11, one such different tool holder and tool comprises a side-mounted drill 192 held at one end of a drive arm 193 and driven through a gear box 194 by a motor 196 at the opposite end of the arm 193. The mechanism is held on the tool mount 115 (not seen in FIG. 11) by a mounting block 197 having a female dovetail base 198 mating with the dovetail 117 on the tool mount 115.

In FIG. 12 is shown a saw 200, for providing vertical cuts or slots, that is mounted in a support block 201 having a dovetail base 202 lying along an axis parallel to the central axis of the saw 200. A motor 203 mounted on the block 201 drives the saw 200 through a belt 204.

It can therefore be seen that a multiplicity of different tools providing a wide range of different functions including machining, manipulation and delivery of coolant is provided by this assemblage of units, while alternative functions can readily be provided.

In the system of FIGS. 1 to 4, as best seen in FIG. 1, hydraulic, pneumatic and electrical lines are fed from a support bracket 210 mounted on the bed 10 and coupled to lines which have adequate length and flexibility to move with the carriage 14. A coolant collector pan 212 is disposed along the Y axis beneath the operative edges of the cutting tools, and transfers coolant to a container 213. A collection device (not shown) may be disposed to collect the parts as they are finished by the machining process.

Figure 8:
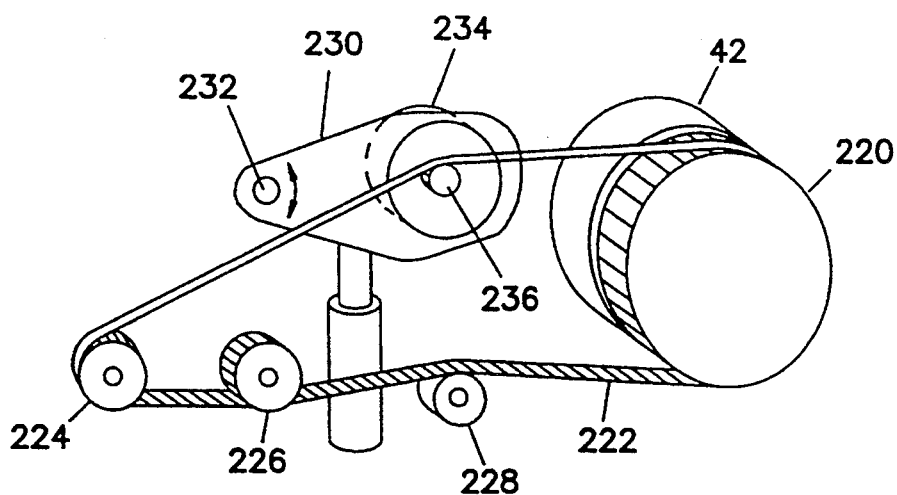
FIG. 8 is a fragmentary perspective view of the spindle drive system in the system of FIG. 1.
Figure 9:
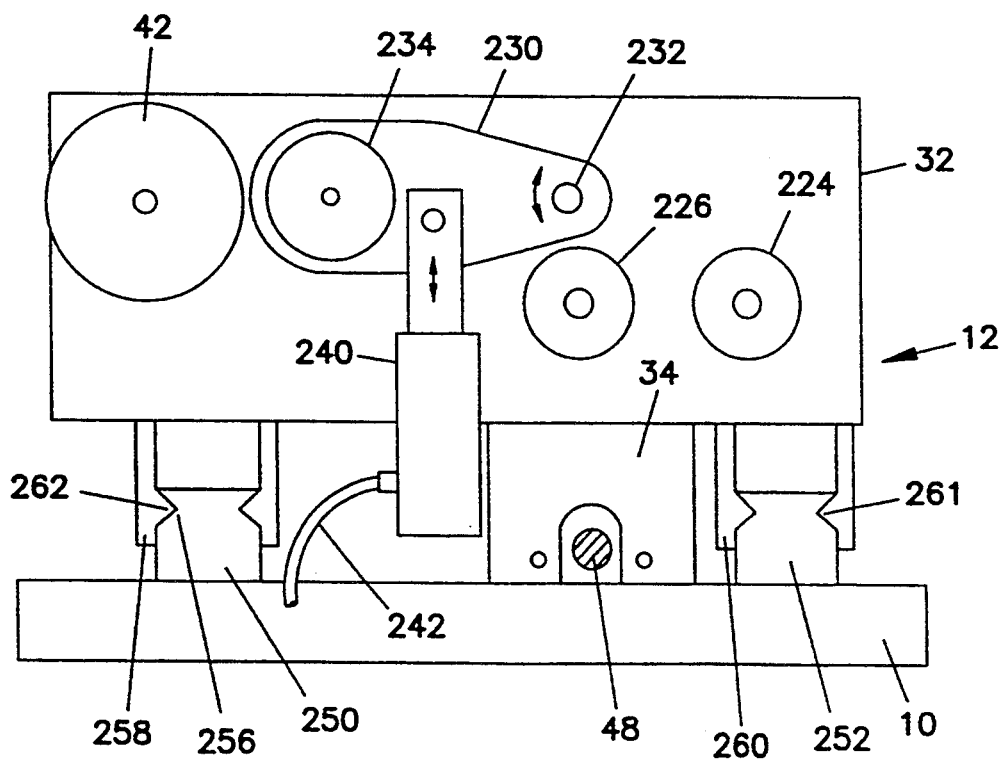
FIG. 9 is an end view of the arrangement of FIG. 8.
Figure 10:
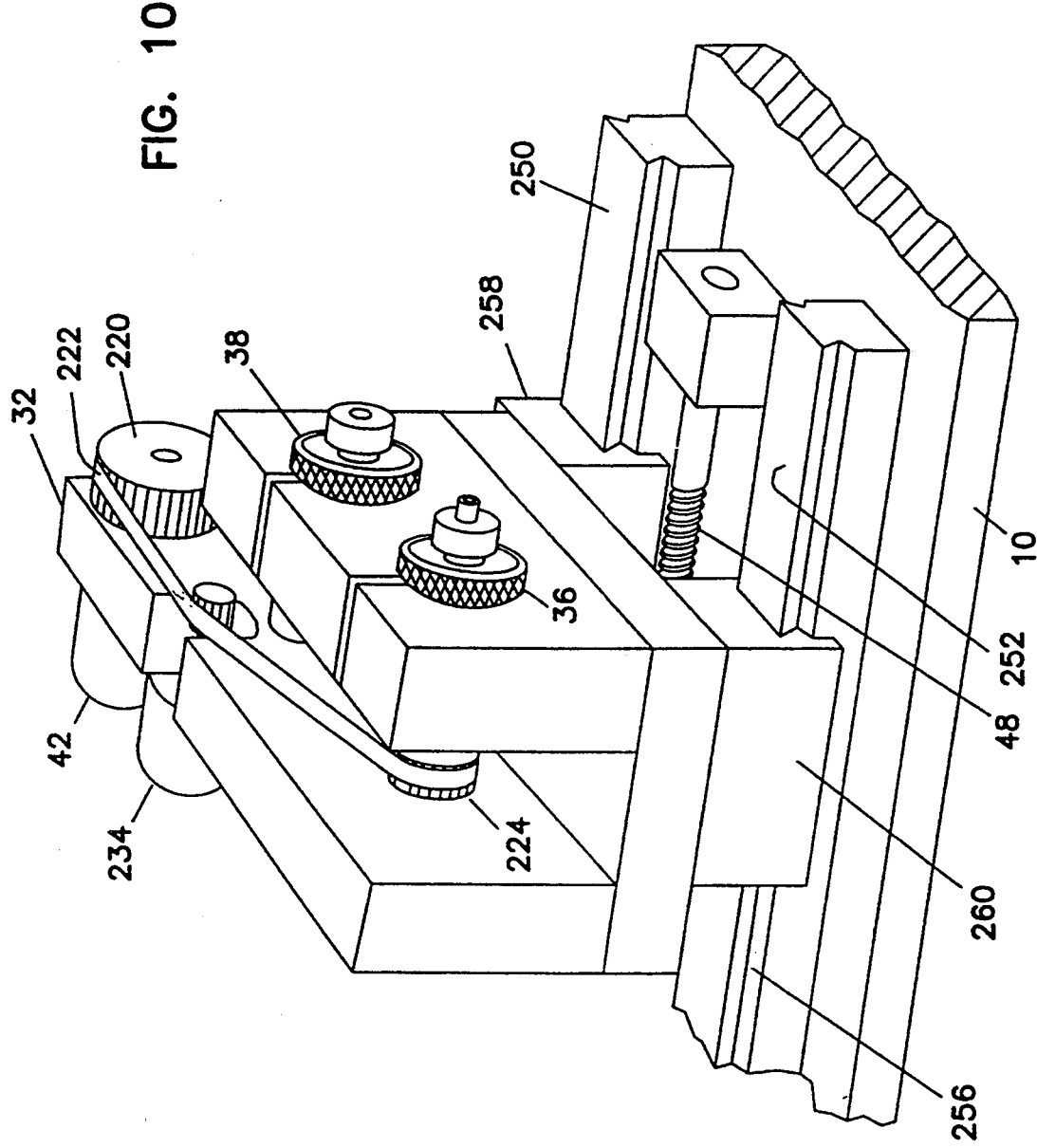
FIG. 10 is a fragmentary perspective view of a part of the positioning mechanism for the spindle system in FIG. 1.

The spindle mechanism 12, including the transmission system 44, is shown in FIGS. 8–10 with the spindle positioner drive being best seen in FIG. 10. Referring to FIGS. 8–10, a synchronous drive motor 42 for driving both spindles simultaneously is coupled to rotate a drive capstan 220 about which a belt 222 is turned, the belt engaging the peripheries of driven capstans 224 and 226 for the separate spindle/collet mechanisms 36, 38 respectively. A belt tightener 228 is positioned along the belt path to insure that there is sufficient wrap angle about the second driven roller 226. Thus, when the motor 42 is actuated the belt 222 drives both capstans concurrently, and in like direction. However, a separate stepper motor 234 is also mounted on the spindle frame 32 via an arm 230 rotatable about a pivot shaft 232. The pivot shaft 232 is supported in the frame 32 (FIG. 8) at a pivot pin 232. The stepper motor 234 turns a small drive capstan 236 after it is rotated upwardly about the pivot pin 232 to engage the belt 222 firmly, by a pneumatic actuator 240 engaged to the arm 230. The actuator 240 is powered from a pneumatic line 242 controlled by the CPU control. When the stepper motor 234 is actuated, the synchronous motor 42 is not operated, and the engagement of the small drive capstan 236 against the belt 222 allows the drive rollers 224, 226 to be stepped to chosen angular positions. Thus, the stock may be rotated to an index position under CPU control, and thereafter turned through chosen areas, such as 90° angles for slot cutting, placed at given angular positions, so that a side drill can create one or a number of.

As seen in FIG. 10, the X axis guide means 30 comprises a pair of guide rails 250, 252 supporting the spindle base 254. Each guide rail 250 or 252 includes side grooves 256, and U-shaped followers 258, 260 having linear ball bearings 261, 262 that ride in the side grooves 256 constrain the spindle base 254 and the entire spindle mechanism to precise movement along the X axis. The drive motor 46 turns the lead screw 48 which rotates within a nut 264 in the spindle base 254, to generate X axis motion of the entire spindle mechanism 12. A fixed bearing 266 at the end of the bed 10 supports the free end of the lead screw 48.

Stock fed through the center of the spindle/collet mechanisms 36, 38 may be supplied in conventional fashion from the rear end of the structure toward the X, Y axis intersection, or alternatively may be gripped by a tool and maneuvered into position with a precise placement relative to the referenced axes. Means for advancing the stock and replacing the collets are well known and are therefore not shown in this example.

It should therefore be appreciated that there is virtually unparalleled capability in this system for fabrication of conventional and unusual parts. Since tools may be placed at arbitrary positions along the Y axes, and since their locations can readily be precisely determined, stored and kept available with an adequate number of tools for a given operation the tooling operation can be accomplished wholly by software.

The software of the system is therefore readily so organized and structured that a relatively inexperienced operator can make the adjustments needed, test the operation at each step, and preserve the commands for future replication of the part.

Programming starts with selection of control primitives for control of stepping motors and operations, as by using commercial multi-axis control cards for an IBM MSDOS type of microcomputer. To operate a given drive for a given purpose, the primitives or elemental commands establish the number of pulses to be delivered, and the rate at which they can be delivered during initiation, high-speed run and deceleration.

Certain prerequisites that must be met before a given machine function can be carried out are supplied in the next tier of software. These include, for example, assurance that proper initial steps, such as turning on coolant, controlling indexing operation, and the like have been carried out. These preparatory sequences are largely invariant, and once developed for a specific machine function, can be held in storage and used thereafter.

Thereafter, specific machine functions such as "home turn tool", "advance stock" and "tool 16" are based on assemblies of elemental commands which each carry out a number of subsequences in X and Y motions. Again, those "functions" are almost invariant, and their selection from storage requires minimal skill and time of the operator.

Thereafter, an assembly of such machine functions provides the sequence of definitions needed for fabrication of a particular part. The part sequence is identified with a unique name that is stored and thereafter may be called upon as needed.

Precise dimensional information must be entered, however, and this can be done by the next hierarchy of commands, utilizing either the entry of dimensional data from keyboard controls or the use of the joystick control to command X and Y motion while observing the magnified image. Absolute values can be entered by simple commands, using designated control keys together with numerical data to specify desired positions in X and Y. Alternatively, joystick commands cause movement of the spindle mechanism and tool mechanism in X and Y, concurrently or separately, and as the movement takes place the incremental pulses are counted and the position information is generated.

With the entire part definition in storage, it is still desirable to verify the operation thus defined. Using keyboard control, the operator can step through each individual portion of the program, making adjustments as needed by observation. For example, if the tool and the stocks are to be brought together at the X, Y intersection in a precise relationship, this will be immediately apparent in the magnified image on the monitor, and adjustment may be made at that point if one is required. When all of the steps of the part definition have been completed in the single step mode, then the system can run automatically in the production of parts.

Although there have been described above and illustrated in the drawings various forms and modifications in accordance with the invention, it will be appreciated that the invention is not limited thereto but encompasses all variations within the scope of the appended claims.

I claim:

1. A system for mounting a plurality of tools, comprising:
   guide means including slider surface means along a first longitudinal axis;
   carriage means engageable on the slider surface means and both comprising dovetail means for supporting the carriage means along the longitudinal axis in a first plane;
   a plurality of tool holders removably mounted on the carriage means in a direction transverse to the longitudinal axis;
   a plurality of tools, each mounted on a different one of the holders and each having an operative surface lying along a second plane parallel to the first plane and adjacent a line parallel to the first axis, the tools including end stop surface means adjustable in a direction perpendicular to the first axis on at least one of the tool holders and a turnaround tool for reversing stock on at least a second one of the holders; and
   means coupled to the carriage means for incrementally stepping the carriage means along the first axis.

2. A system for short run production of small precision parts, comprising:
   spindle means movable along a first horizontal axis in response to first axis signal commands, the spindle means including collet means for holding stock to be machined;
   tool means movable along a second horizontal axis orthogonal to the first axis in response to second axis signal commands, the tool means including a number of tools disposed along the second axis facing the spindle means;
   the operative positions of the spindle means and the tool means being known relative to the first and second axes, and the first and second axes intersecting at a reference point;
   data processing means including means for storing data as to the operative positions of the spindle means and the tool means, means for storing a series of function commands for different operations on stock to be machined, and means for generating first and second axis commands for the spindle means and tool means respectively; and
   viewing means providing a magnified image disposed to view the region of intersection of the first and second axes, and wherein the system includes means for storing the positions of the stock and tool means relative to the intersection for different functions, whereby the stock and tool means can be precisely positioned without cumulative errors being introduced.

3. A system as set forth in claim 2 above, wherein the tool means comprise both moving and stationary tools for machining the stock, and wherein the system further comprises electrical, mechanical and pneumatic stock manipulating devices for manipulating the stock and supporting the machining operations.

4. A system as set forth in claim 3 above, wherein the tool means comprises carriage means movable along the second horizontal axis, and wherein the tool means and devices for manipulating the stock are mounted on the carriage along the second axis and directed along the first axis toward the spindle means.

5. A system as set forth in claim 4 above, wherein the tool means comprises carriage means having a dovetail surface and a plurality of tool holder removably mounted on the dovetail surface, and further comprises a pair of guide means mounted below the carriage means and parallel to the second axis and means including linear ball bearings for supporting the carriage means parallel to the second axis with low friction, and stepper motor means coupled to position the carriage means along the second axis.

6. A system as set forth in claim 5 above, wherein the spindle means comprises a pair of spaced apart guide means mounted parallel to the first axis, linear ball bearing means for supporting the spindle means on the guide means, and stepper motor means coupled to position the spindle means along the first axis.

7. A system as set forth in claim 2 above, wherein the spindle means comprises a pair of spindle mechanisms spaced apart along the second axis and extending along the first axis to define two reference intersections, and the viewing means comprises camera means mounted to view an individual one of the reference intersections, the camera means including means for moving the camera means along the second axis to the selected one of the reference intersections.

8. A system as set forth in claim 2 above, wherein the spindle means comprises a spindle drive motor with a spindle drive motor belt drive means and a separate stepping motor, first capstan means coupled to the stepping motor, second capstan means coupled to the spindle drive motor belt drive means coupling the first, and means for shifting the second capstan means out of engagement with the belt drive means.

9. A system as set forth in claim 8 above, wherein the spindle means further comprises a frame supporting the drive motor, stepping motor and first, second and third capstan means, and pivot arm means coupled to the frame and supporting the stepping motor and second capstan means, and actuator means for moving the pivot arm means to shift the second capstan means out of engagement with the belt drive means.

10. A system as set forth in claim 2 above, further including a stable bed underlying the spindle means and tool means, and means mounted on the bed adjacent the tool means on the side opposite the tools thereon for coupling support connections to the tool means.

11. A system for screw machine-type manufacture of small parts comprising:
a planar machine bed;
first carriage means movable along the bed in a Y axis direction in response to Y axis commands;
second carriage means including spindle/collet means for holding a part to be machined, the second carriage means being movable relative to the bed along an X axis direction, in response to X axis commands;
a plurality of tool means mounted on the first carriage means, each of the tool means having a known operative position in X and Y;
viewing means providing a magnified image disposed to view the region of intersection of the X and Y axes, and wherein the system includes means for storing the positions of the stock and tool means relative to the intersection for different functions, whereby the stock and tool means can be precisely positioned without cumulative errors being introduced; and
data processor means including data storage means, signal input means and comprising:
(a) means storing sequences of commands for different tool operations,
(b) means storing reference data identifying the X, Y positions of the operative portions of tools on the first carriage,
(c) means responsive to the signal input means for modifying dimensions in the sequences of commands, and
(d) means responsive to the stored sequences of commands and the X, Y positions of the tool operative portions for generating digital signal commands for the first and second carriage means.

12. A system as set forth in claim 11 above, further comprising means for providing sequences of positioning commands to control the first and second carriage means concurrently so as to provide a sequence of different machining operations at the X, Y intersection from data entry alone and without modification of the tool positions.

13. A system for screw machine-type manufacture of small parts comprising:
a planar machine bed;
first carriage means movable along the bed in a Y axis direction in response to Y axis commands;
second carriage means including spindle/collet means for holding a part to be machined, the second carriage means being movable relative to the bed along an X axis direction, in response to X axis commands;
a plurality of tool means mounted on the first carriage means, each of the tool means having a known operative position in X and Y;
data processor means including data storage means, signal input means and comprising:
(a) means storing sequences of commands for different tool operations,
(b) means storing reference data identifying the X, Y positions of the operative portions of tools on the first carriage,
(c) means responsive to the signal input means for modifying dimensions in the sequences of commands,
(d) means responsive to the stored sequences of commands and the X, Y positions of the tool operative portions for generating digital signal commands for the first and second carriage means
(e) means for providing sequences of positioning commands to control the first and second carriage means concurrently so as to provide a sequence of different machining operations at the X, Y intersection from data entry alone and without modification of the tool positions; and
wherein the spindle/collet means includes means for feeding stock therethrough and means for driving the spindle to fixed angular positions, and wherein the tool holder means include means for removable attachment to the first carriage means.

14. The system as set forth in claim 13 above, wherein the system further includes first and second guide means disposed along the bed and extending along the X and Y axes respectively, and slidably coupled to the first and second carriage means respectively, and wherein the operative portions of the tools are disposed serially along the Y axis direction in proximate X axis positions.

15. The system as set forth in claim 14 above, wherein the first guide means comprises a pair of guides transversely spaced relative to the Y axis and having opposite dovetails, and wherein the first carriage means includes linear ball bearing means mating with the dovetails in the first guide means, and wherein the second guide means comprises a pair of guides substantially parallel to the X axis and including dovetail surfaces thereon and extending therealong, and wherein the second carriage means includes linear ball bearings mating with the dovetails in the second guide means.

16. The system as set forth in claim 15 above, further including first and second ball screw drive means coupled to the first and second carriage means respectively, and disposed along the Y and X axes respectively, and first and second stepper motor means responsive to the digital signal commands for driving the first and second carriage means through the first and second ball screw drives respectively.

17. The system as set forth in claim 12 above, further including viewing means positioned to be directed at the X, Y intersection and including means providing a magnified video image, and video display means proximate the bed for displaying the magnified image of the X, Y intersection, and wherein the system includes means for identifying and storing the positions of the stock and tool means relative to the intersection for different functions, whereby the stock and tool means can be precisely positioned without cumulative errors being introduced.

18. The system as set forth in claim 17 above, wherein the system further comprises means coupled to the processor means for generating Y and X axis digital commands to adjust the relative position of said first and second carriage means to modify the relative positions of the tools adjacent the X,Y intersection to the spindle/collet and stock therein.

19. A system for screw machine-type manufacture of small parts comprising:
   a planar machine bed;
   first carriage means movable along the bed in a Y axis direction in response to Y axis commands;
   second carriage means including spindle/collet means for holding a part to be machined, the second carriage means being movable relative to the bed along an X axis direction, in response to X axis commands;
   a plurality of tool means mounted on the first carriage means, each of the tool means having a known operative position in X and Y;
   data processor means including data storage means, signal input means and comprising:
      (a) means storing sequences of commands for different tool operations,
      (b) means storing reference data identifying the X, Y positions of the operative portions of tools on the first carriage,
      (c) means responsive to the signal input means for modifying dimensions in the sequences of commands,
      (d) means responsive to the stored sequences of commands and the X, Y positions of the tool operative portions for generating digital signal commands for the first and second carriage means
      (e) means for providing sequences of positioning commands to control the first and second carriage means concurrently so as to provide a sequence of different machining operations at the X, Y intersection from data entry alone and without modification of the tool positions;
   viewing means positioned to be directed at the X, Y intersection and including means providing a magnified video image, and video display means proximate the bed for displaying the magnified image of the X, Y intersection;
   means coupled to the processor means for generating Y and X axis digital commands to adjust the relative position of said first and second carriage means to modify the relative positions of the tools adjacent the X, Y intersection to the spindle/collet and stock therein; and
   wherein the means for adjusting comprises joystick means and the data processor means includes means for generating X and Y axis digital commands that are responsive to the movement of the joystick means.

20. The system as set forth in claim 12 above, wherein the tools mounted on the tool holder means comprise both stationary and moving tools, including stationary tools for referencing the position of the bar stock and moving tools for turning around the bar stock.

21. The system as set forth in claim 20 above, wherein the tools comprise non-orthogonal tool means and the data processing system includes means for generating X and Y commands concurrently to drive the non-orthogonal tool along an axis relative to the bar stock that is non-orthogonal to the X and Y axes.

22. A mechanism for performing multiple machining operations on small bar stock comprising:
   a bed having an upper surface defining an X, Y plane;
   a first carriage movable along the bed in a Y axis direction;
   a plurality of separate tool holder means replaceably coupled to the first carriage at different positions along the Y axis and each including tools mounted on each tool holder means, within a zone spanning a range in the X axis and extending along the Y axis;
   spindle/collet means including a second carriage movable along the bed in the X axis direction, the X axis and Y axis directions forming a reference X, Y intersection lying in a given horizontal plane above the bed, the spindle/collet means including means for gripping and releasing bar stock to be machined;
   viewing means providing a magnified image disposed to view the region of intersection of the X and Y axes, and wherein the system includes means for storing the positions of the stock and tool means relative to the intersection for different functions, whereby the stock and tool means can be precisely positioned without cumulative errors being introduced; and
   means for controlling movements of the first and second carriages in the X and Y axis direction in arbitrary fashion to effect a sequence of machining operations using different tools on the bar stock.

23. The mechanism as set forth in claim 22 above, wherein the mechanism further includes first and second guide means mounted on the bed and having dovetail side surfaces for providing guidance along the Y axis and X axis directions respectively, and wherein the first and second carriage means include means mating with the dovetails in the first and second guide means respectively, and wherein the system further includes first and second motor means responsive to digital signal commands from an electronic processor for driving the first and second carriage means respectively.

24. The mechanism as set forth in claim 23 above, wherein the tools are fixedly preattached to the tool holder means, and wherein the tools comprise both moving and stationary elements for machining the bar stock in different operations.

25. The mechanism as set forth in claim 24, wherein the mechanism further comprises joystick means for generating signals for X and Y axis control, means responsive to the joystick means and coupled to the carriage means for commanding the carriage means in proportion to the joystick position, and wherein the spindle/collet means comprises a pair of spindles spaced apart along the Y axis.

26. The mechanism as set forth in claim 25 above, wherein the viewing means includes camera means mounted to be movable along the Y axis and viewing the X, Y reference intersection, and video display means coupled to the camera means for providing a magnified image of the X, Y reference intersection of a spindle in operation.

27. A machine tool system for performing a multiplicity of serial operations on round bar stock comprising:
a platform having a flat, horizontal superior surface; base means mounted on the platform;
a pair of X axis guide rails mounted on the base means along a horizontal X reference axis, the guide rails being spaced apart transverse to the X axis direction, each of the guide rails having side guide grooves therein;
a spindle frame assembly disposed above the base means, the spindle frame assembly including a pair of linear ball bearing guide rail followers on the lower side thereof, each slidably engaging a different one of the guide rails and including means registering in the side guide grooves therein, the spindle frame assembly also including a vertical plate transverse to the X axis and a spindle holder member adjacent a Y axis along one side thereof and spaced apart from the vertical plate along the X axis;
a pair of spindle means mounted in spaced apart relation along the Y axis in the spindle holder member to rotate along horizontal axes parallel to the X axis and spaced apart along the Y axis, the spindle means including collet means and means to advance bar stock therethrough along the X axis direction to intersect the Y axis;
spindle drive motor means mounted on the vertical plate on the side opposite the Y axis;
belt drive means coupled to the spindle drive motor means and mounted between the vertical plate and the spindle holder member for selectively driving the spindle means from the spindle drive motor means;
first stepping motor means mounted in fixed relation to the base means and opposite from the Y axis, the first stepping motor means rotating about an axis parallel to the X axis;
first ball screw drive means coupled to the first stepping motor means and disposed along the axis thereof;
follower means on the spindle frame assembly engaging the first ball screw drive means for moving said assembly along the X axis in response to actuation of said first stepping motor means;
a tool support bar disposed adjacent and parallel to the Y axis, said bar including a dovetail section with horizontal superior surface and horizontal lower surface;
a first horizontal Y axis guide rail attached to the underside of the support bar at the lower surface thereof and extending along an axis parallel to the Y axis;
a second horizontal Y axis guide rail mounted on the base means parallel to the Y axis and spaced apart from the first guide rail further from the Y axis, each of the first and second Y axis guide rails having side grooves therein;
first Y axis linear ball bearing means mounted on the base means and slidably engaged to the first Y axis guide rail an the side grooves therein;
second Y axis linear ball bearing means coupled to the tool support bar and slidably engaged to the second Y axis guide rail and the side grooves therein;
second stepping motor means mounted in fixed relation to the base means to rotate about a Y axis spaced apart from the Y reference axis on the opposite side from the tool support bar;
second ball screw drive means coupled to the second stepping motor means and extending along its axis;
means engaging the second ball screw drive means and coupled to the tool support bar for moving the tool support bar along the Y axis direction in response to actuation of the second motor means;
a plurality of tool holder means disposed along the upper surface of the tool support bar and including dovetail apertures precisely engaging the dovetail section of the tool support bar, the tool holder means each including means for detachably securing the tool holder to the tool support bar at a selected Y axis position thereon; and
a plurality of tools for machining operations, each mounted on a different tool holder means in a direction facing the Y reference axis.

28. A system for driving at least one spindle/collet mechanism rotatable about a given axis comprising: a first drive motor; a drive capstan coupled to the first drive motor; belt means coupling the first drive motor capstan to the spindle/collet system; a stepper motor disposed adjacent to the belt; drive capstan means coupled to the stepper motor and in proximate relation to the belt; and means for shifting the position of the stepper motor capstan so that the stepper motor capstan engages the belt, whereby the spindle/collet drive can be alternatively incremented by the stepper motor as well as being driven by the first drive motor.

29. A system as set forth in claim 28 above, wherein a second spindle/collet drive has coupled to be engaged by the belt and further including: frame means for supporting the first drive motor and the spindle/collet drives; an arm pivotally coupled to said spindle frame and supporting the stepper motor for movement in a plane parallel to the plane of movement of the belt; and an actuator cylinder.

* * * * *

UNITED STATES PATENT AND TRADEMARK OFFICE
CERTIFICATE OF CORRECTION

PATENT NO.   :   5,392,502

DATED        :   February 28, 1995

INVENTOR(S)  :   Edgar P. Freer

It is certified that error appears in the above-identified patent and that said Letters Patent is hereby corrected as shown below:

In column 2, line 37, "x and y" should read --X and Y--;

In column 6, line 39, "60" should read --50--;

In column 7, line 58, "macrosequences" should read --macro-sequences--;

In column 10, line 61, "a" should read --an--;

In column 11, line 1, "move" should read --moved--;

In column 14, line 46, "holder" should read --holders--;

In column 16, line 25, please insert --,-- after the word "means";

In column 17, line 41, please insert --,-- after the word "means".

Signed and Sealed this

Twenty-sixth Day of September, 1995

Attest:

BRUCE LEHMAN

Attesting Officer        Commissioner of Patents and Trademarks